United States Patent
Johnson

(10) Patent No.: US 7,443,864 B1
(45) Date of Patent: Oct. 28, 2008

(54) WIRELESS COMMUNICATION SYSTEM BACKHAUL ARCHITECTURE

(75) Inventor: Harold W. Johnson, Roach, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 849 days.

(21) Appl. No.: 10/740,329

(22) Filed: Dec. 16, 2003

(51) Int. Cl.
*H04L 12/28* (2006.01)
(52) U.S. Cl. .................. 370/400; 370/403; 370/258
(58) Field of Classification Search .......... 370/338, 370/349, 400, 403
See application file for complete search history.

(56) References Cited

U.S. PATENT DOCUMENTS

| | | | | |
|---|---|---|---|---|
| 6,453,033 B1 * | 9/2002 | Little et al. | | 379/219 |
| 6,785,558 B1 * | 8/2004 | Stratford et al. | | 455/561 |
| 6,865,170 B1 * | 3/2005 | Zendle | | 370/338 |
| 6,917,816 B2 * | 7/2005 | Abed et al. | | 455/556.1 |
| 6,963,552 B2 * | 11/2005 | Sabat et al. | | 370/338 |
| 7,031,697 B2 * | 4/2006 | Yang et al. | | 455/414.1 |
| 2006/0039301 A1 * | 2/2006 | Tsuji et al. | | 370/258 |

* cited by examiner

*Primary Examiner*—Ricky Ngo
*Assistant Examiner*—Dewanda Samuel

(57) ABSTRACT

A communication system utilizes point-to-multipoint wireless links between base stations and wireless hubs that are co-located at some of the base stations. Bonded circuits may be used between the wireless hubs and a communication ring. A mobile switching center is coupled to the communication ring. The base stations and the mobile switching center exchange user communications in the Ethernet format over the point-to-multipoint wireless links, bonded circuits, and the communication ring.

28 Claims, 3 Drawing Sheets

WIRELESS COMMUNICATION SYSTEM BACKHAUL ARCHITECTURE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to backhaul for wireless communication systems 2. Description of the Prior Art Wireless base stations communicate with users over wireless access links, such as Personal Communication Service (PCS) links, Time Division Multiple Access (TDMA), Code Division Multiple Access (CDMA) links, Microwave Multipoint Distribution Service (MMDS), and Global System for Mobile Communications (GSM) links. Typically, the base stations are mounted on elevated structures, such as building rooftops or towers. On the network side, the base stations communicate with a Mobile Switching Center. (MSC). The MSC exchanges user traffic between the base stations, and also between the base stations and local telephone systems, long distance telephone systems, and the Internet.

Time Division Multiplex (TDM) connections provide the communication capability between the base stations and the MSC. A dedicated TDM connection is often required between each base station and the MSC. These dedicated TDM connections are often DS1/DS3 connections that are leased from a local telephone company. Unfortunately, multiple leased TDM connections can be very expensive.

In addition, the dedicated nature of this bandwidth can be very inefficient. Different geographic areas have different busy hours, and thus, traffic patterns between base stations in these areas and the MSC also varies. When an area is busy, the TDM connections from that area to the MSC are also busy. Unfortunately, when an area is not busy, the expensive bandwidth on the dedicated TDM connections from that area to the MSC goes largely unused.

Wireless communication systems are available that provide 30 megabits of wireless bandwidth from a central point to multiple other points. These systems utilize point-to-multipoint radio equipment from Hughes or Cisco.

A circuit bonding device concatenates user communications for transfer over bonded circuits. At the receiving end, another circuit bonding device receives and de-concatenates the user communications. The circuits that are bonded together typically comprise unbundled network elements, such as twisted pairs, DS1 links, or DS3 links, that are obtained from Incumbent Local Exchange Carriers at wholesale rates pursuant to Federal rules. The circuit bonding devices may include Ethernet interfaces. One example of a conventional circuit bonding device is the equipment provided by Ceterus Networks.

Many metropolitan areas have communication rings. These rings transfer communications in Ethernet over Synchronous Optical Network (SONET) over Wave Division Multiplexing (WDM).

Unfortunately, point-to-multipoint radio, circuit bonding, and communication rings have not been effectively implemented to solve the cost and efficiency problems of wireless system backhaul.

SUMMARY OF THE INVENTION

Some examples of the invention include a communication system that is configured and operates as follows. A plurality of first wireless base stations exchange user communications with mobile users over first wireless access links. A first wireless hub is co-located with a first one of the first wireless base stations, and the first one of the first wireless base stations and the first wireless hub exchange the user communications. The other ones of the first wireless base stations and the first wireless hub exchange the user communications in an Ethernet format over first point-to-multipoint wireless links. A plurality of second wireless base stations exchange user communications with the mobile users over second wireless access links. A second wireless hub is co-located with a first one of the second wireless base stations, and the first one of the second wireless base stations and the second wireless hub exchange the user communications. The other ones of the second wireless base stations and the second wireless hub exchange the user communications in the Ethernet format over second point-to-multipoint wireless links. A communication ring includes a plurality of ring access nodes. A first one of the ring access nodes and the first wireless hub exchange the user communications in the Ethernet format over a first connection. A second one of the ring access nodes and the second wireless hub exchange the user communications in the Ethernet format over a second connection. The first ring access node and a third ring access node exchange the user communications in the Ethernet format over the communication ring. The second ring access node and the third ring access node exchange the user communications in the Ethernet format over the communication ring. A mobile switching center exchanges the user communications in the Ethernet format with the third ring access node. The mobile switching center exchanges the user communications with a local telephone network, a long distance telephone network, and an Internet.

In some examples of the invention, the first connection comprises first bonded circuits and the second connection comprises second bonded circuits.

In some examples of the invention, the first connection and the second connection comprise fiber links that use Synchronous Optical Network (SONET) or Passive Optical Network (PON).

In some examples of the invention, the first wireless access links and the second wireless access links comprise Personal Communication Service (PCS) links, Time Division Multiple Access (TDMA) links, Code Division Multiple Access (CDMA) links, Microwave Multipoint Distribution Service (MMDS) links, or Global System for Mobile Communications (GSM) links.

In some examples of the invention, the communication ring comprises a Resilient Packet Ring (RPR) or a Metropolitan Area Network (MAN).

In some examples of the invention, the communication ring transfers the user communications using Ethernet over Synchronous Optical Network (SONET) over Wave Division Multiplexing (WDM).

In some examples of the invention, the first wireless hub and the first wireless base station are co-located on a first elevated structure and the second wireless hub and the second wireless base station are co-located on a second elevated structure.

In some examples of the invention, the first bonded circuits and the second bonded circuits comprise unbundled network elements obtained from an Incumbent Local Exchange Carrier (ILEC).

In some examples of the invention, the first wireless base stations and the second wireless base stations have different busy hours.

DETAILED DESCRIPTION OF THE PREFERRED EMBODIMENT

Figure 1:
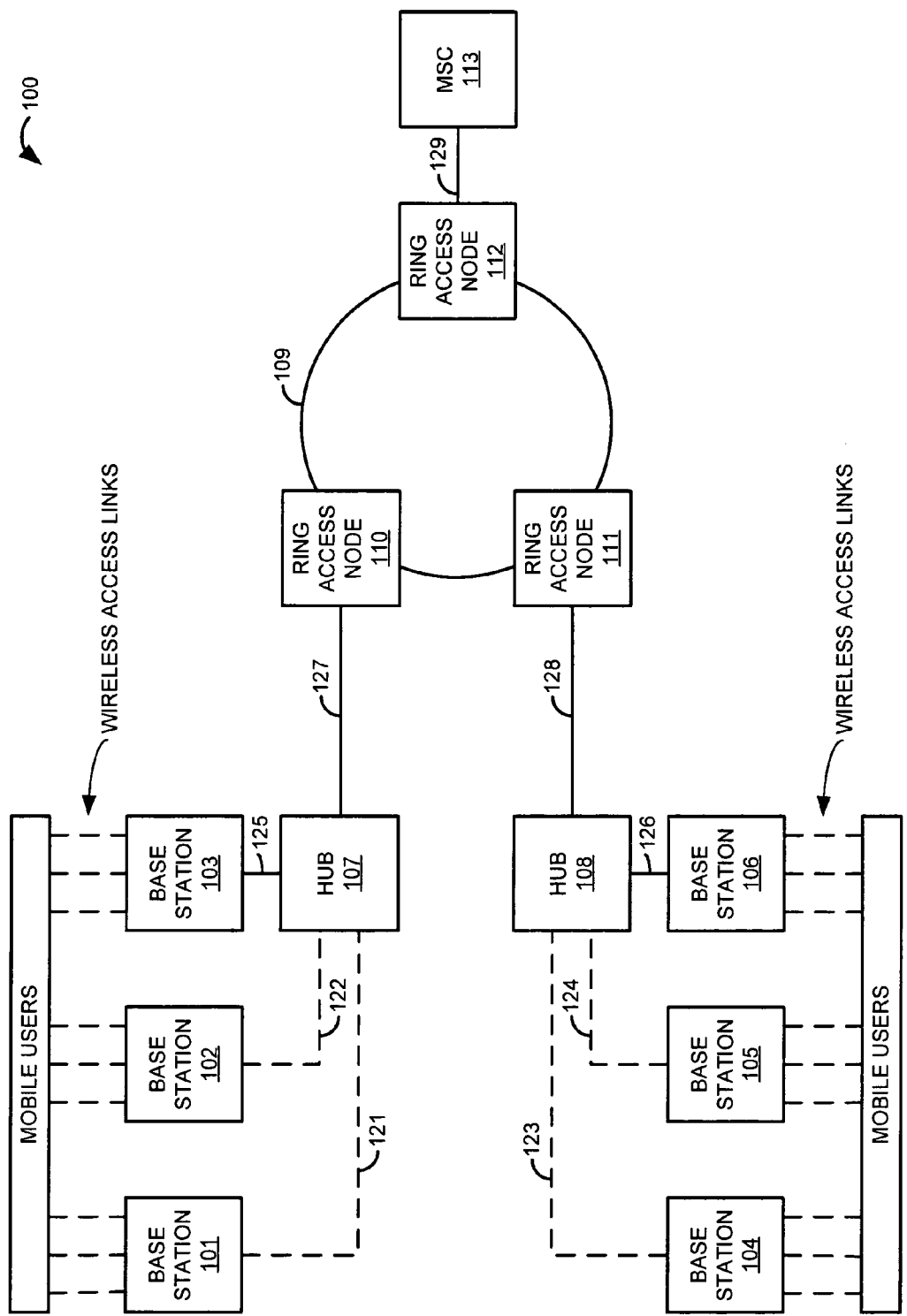
FIG. 1 illustrates a communication system in an example of the invention.
Figure 2:
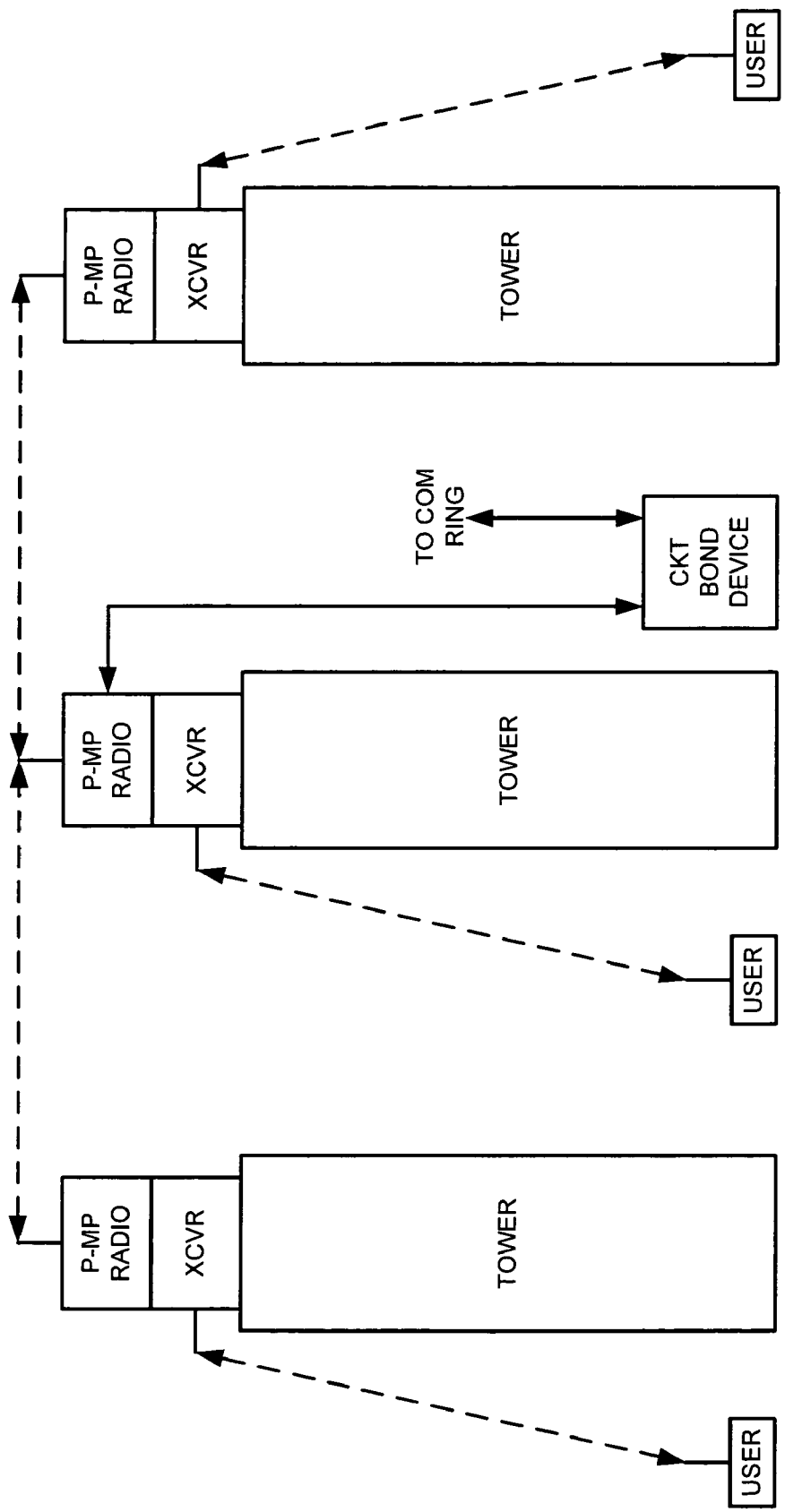
FIG. 2 illustrates a communication system in an example of the invention.
Figure 3:
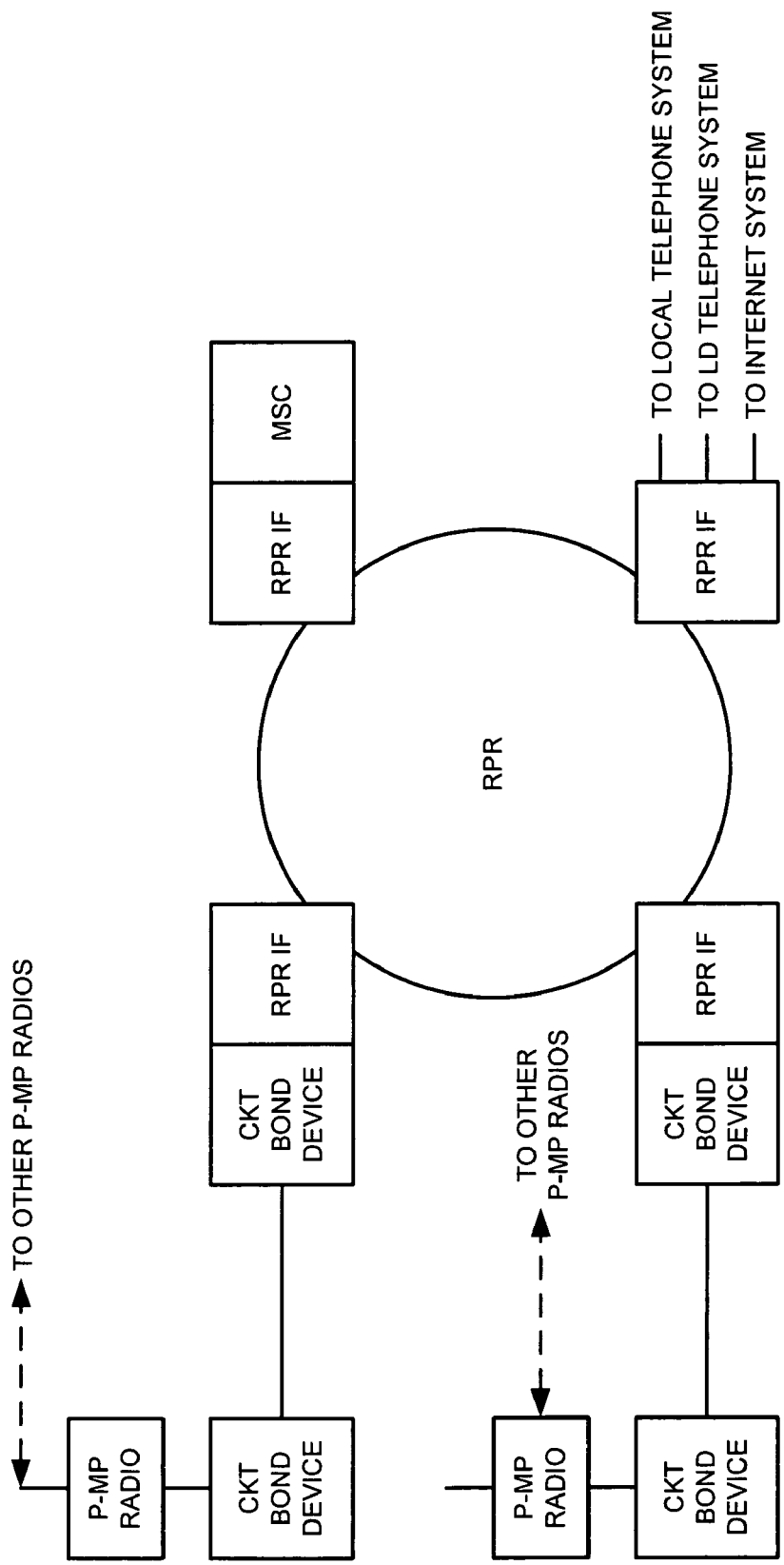
FIG. 3 illustrates a communication system in an example of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

EXAMPLE #1

FIG. 1 illustrates communication system 100 in an example of the invention. On FIG. 1, wireless links are shown as dashed lines and wireline links (including optical fiber communications) are shown as solid lines. Communication system 100 includes wireless base stations 101-106, wireless hubs 107-108, communication ring 109, and Mobile Switching Center (MSC) 113. Communication ring 109 includes ring access nodes 110-112.

Base stations 101-103 form a first set of base stations, and base stations 104-106 form a second set of base stations. Wireless hub 107 is co-located with base station 103 and serves the first set of base stations 101-103. Wireless hub 108 is co-located with base station 106 and serves the second set of base stations 104-106. Co-location means that the base station and hub are located at the same site or facility. Typically, the co-located wireless hub and base station are mounted on the same elevated structure, such as the same tower or building rooftop.

Base stations 101-106 exchange user communications with mobile users over wireless access links. The wireless access links could be Personal Communication Service (PCS) links, Time Division Multiple Access (TDMA) links, Code Division Multiple Access (CDMA) links, Microwave Multipoint Distribution Service (MMDS) links, Global System for Mobile Communications (GSM) links, or some other type of wireless link for mobile users to access communication system 100.

Base station 101 exchanges the user communications in an Ethernet format with wireless hub 107 over wireless link 121. Base station 102 exchanges the user communications in the Ethernet format with wireless hub 107 over wireless link 122. Base station 104 exchanges the user communications in the Ethernet format with wireless hub 108 over wireless link 123. Base station 105 exchanges the user communications in the Ethernet format with wireless hub 108 over wireless link 124. Wireless links 121-122 comprise a first set of point-to-multipoint wireless links, and wireless links 123-124 comprise a second set of point-to-multipoint wireless links. One example of point-to-multipoint wireless links are provided by the point-to-multipoint radio systems supplied by Hughes or Cisco. These radio systems provide 30 megabits of point-to-multipoint wireless bandwidth.

Base station 103 exchanges the user communications in the Ethernet format with co-located wireless hub 107 over link 125. Base station 106 exchanges the user communications in the Ethernet format with co-located wireless hub 108 over link 126. Since these base stations and wireless hubs are co-located, links 125-126 are typically wireline, but links 125-126 could be wireless if desired.

Wireless hub 107 exchanges the user communications in the Ethernet format with ring access node 110 over bonded circuits 127. Wireless hub 108 exchanges the user communications in the Ethernet format with ring access node 111 over bonded circuits 128. Wireless hubs 107-108 and ring access nodes 110-111 each include bonding devices that concatenate the user communications for transfer over bonded circuits 127-128. These circuit bonding devices receive the transferred user communications from bonded circuits 127-128 and de-concatenate the user communications for subsequent transfer. The circuits that are bonded together typically comprise unbundled network elements, such as twisted pairs, DS1 links, or DS3 links, that are obtained from Incumbent Local Exchange Carriers at wholesale rates pursuant to Federal rules. One example of a circuit bonding device is the equipment provided by Ceterus Networks.

Ring access node 110 exchanges user communications in the Ethernet format with ring access node 112 over communication ring 109. Ring access node 111 also exchanges user communications in the Ethernet format with ring access node 112 over communication ring 109. Communication ring 109 could be a resilient packet ring that forms a metropolitan area network. Communication ring 109 could utilize Ethernet over Synchronous Optical Network (SONET) over Wave Division Multiplexing (WDM).

Ring access node exchanges user communications in the Ethernet format with MSC 113 over link 129. MSC 113 exchanges user communications with a local telephone network (not shown), a long distance telephone network (not shown), and an Internet (not shown).

Alternatively, wireless hub 107 may exchange the user communications in the Ethernet format with ring access node 110 over fiber optic links that employ Synchronous Optical Network (SONET) or Passive Optical Network (PON). Likewise, wireless hub 108 could exchange the user communications in the Ethernet format with ring access node 111 over fiber optic links that employ SONET or PON.

EXAMPLE #2

FIGS. 2-3 illustrate a communication system in an example of the invention. On FIGS. 2-3, wireless links are shown as dashed lines and wireline links (including optical fibers) are shown as solid lines. FIG. 2 shows three towers each having a wireless transceiver and a point-to-multipoint (P-MP) radio.

A wireless transceiver/point-to-multipoint radio pair represents a base station from FIG. 1. The wireless transceivers exchange user communications with the users over wireless access links. The wireless transceivers also exchange the user communications with their respective point-to-multipoint radios.

The point-to-multipoint radio/circuit bonding device pair for the middle tower represents a wireless hub from FIG. 1. The point-to-multipoint radios on the left and right towers exchange the user communications over point-to-multipoint wireless links with the point-to-multipoint radio on the middle tower. The point-to-multipoint radio on the middle tower exchanges the user communications with the nearby circuit bonding device.

FIG. 3 shows two wireless hubs each comprised of a point-to-multipoint radio and a circuit bonding device. As shown in more detail on FIG. 2, these point-to-multipoint radios exchange user communications over wireless point-to-multipoint links with base stations. These point-to-multipoint radios also exchange the user communications with their respective circuit bonding devices.

The circuit bonding devices at the hubs exchange the user communications over bonded circuits with the other circuit bonding devices at the Resilient Packet Ring (RPR). The circuit bonding devices at the RPR are coupled to respective RPR interfaces, and a circuit bonding device/RPR interface pair represents a ring access node from FIG. 1. The circuit bonding devices at the RPR exchange the user communications with their respective RPR interfaces. These RPR interfaces exchange the user communications with the RPR interface that serves the MSC, and that RPR interface exchanges the user communications with the MSC. Through its RPR interface, the MSC exchanges the user communications with another RPR interface that provides access to local telephone system, Long Distance (LD) telephone system, and an Internet system.

Alternatively, the circuit bonding devices and links could be replaced by SONET or PON fiber links.

Together, FIGS. 2-3 illustrate an example of a communication system that uses point-to-multipoint radios to transfer user traffic between base stations and a hub that is co-located at one of the base stations. The hub transfers the user traffic to a communication ring over bonded circuits. The communication ring transfers the user traffic to the MSC. The transfer of the user communications from the base stations to the MSC can occur in the Ethernet format. If desired, the MSC may then exchange the user traffic with local, long distance, or Internet systems.

ADVANTAGES

The above discussion describes a backhaul architecture from wireless base stations to the MSC. Advantageously, this backhaul architecture uses the Ethernet format from end-to-end. To take advantage of existing base station towers, point-to-multipoint wireless links are used between the base stations and wireless hubs that are co-located with some of the base stations—typically on the existing towers. The wireless hubs use circuit bonding technology to efficiently communicate with a communication ring that communicates with the MSC.

Advantageously, the backhaul architecture uses bandwidth more efficiently than prior architectures based on dedicated TDM connections. The point-to-multipoint radio and the RPR communication ring are both shared bandwidth systems, so bandwidth does not have to be dedicated. Bandwidth that is not used by one base station may be used by other base stations.

This bandwidth sharing provides statistical bandwidth gain for the backhaul architecture due to the non-coincident nature of the backhaul traffic. For example, if two different cell sites in a metropolitan area have different busy hours, then the cell sites may efficiently share backhaul bandwidth to the MSC, because the cell sites do not both require peak bandwidth to the MSC at the same time. The statistical gain demonstrates the increased efficiency and cost savings provided by the backhaul architecture.

The invention claimed is:

1. A communication system comprising:
   a plurality of first wireless base stations configured to exchange user communications with mobile users over first wireless access links;
   a plurality of second wireless base stations configured to exchange the user communications with mobile users over second wireless access links;
   a first wireless hub co-located with a first one of the first wireless base stations, wherein the first one of the first wireless base stations and the first wireless hub are configured to exchange the user communications, and wherein other ones of the first wireless base stations and the first wireless hub are configured to exchange the user communications in an Ethernet format over first point-to-multipoint wireless links;
   a second wireless hub co-located with a first one of the second wireless base stations, wherein the first one of the second wireless base stations and the second wireless hub are configured to exchange the user communications, and wherein other ones of the second wireless base stations and the second wireless hub are configured to exchange the user communications in the Ethernet format over second point-to-multipoint wireless links;
   a communication ring including a plurality of ring access nodes, wherein the first wireless hub and a first one of the ring access nodes are configured to exchange the user communications in the Ethernet format over a first connection, wherein the second wireless hub and a second one of the ring access nodes are configured to exchange the user communications in the Ethernet format over a second connection, wherein the first ring access node and a third one of the ring access nodes are configured to exchange the user communications in the Ethernet format over the communication ring, and wherein the second ring access node and the third ring access node are configured to exchange the user communications in the Ethernet format over the communication ring; and
   a mobile switching center configured to exchange the user communications in the Ethernet format with the third ring access node, and to exchange the user communications with a local telephone network, a long distance telephone network, and an Internet.

2. The communication system of claim 1 wherein the first connection comprises first bonded circuits and the second connection comprises second bonded circuits.

3. The communication system of claim 1 wherein the first connection and the second connection comprise fiber links that use Synchronous Optical Network (SONET) or Passive Optical Network (PON).

4. The communication system of claim 1 wherein the first wireless access links and the second wireless access links comprise Personal Communication Service (PCS) links.

5. The communication system of claim 1 wherein the first wireless access links and the second wireless access links comprise Time Division Multiple Access (TDMA) links.

6. The communication system of claim 1 wherein the first wireless access links and the second wireless access links comprise Code Division Multiple Access (CDMA) links.

7. The communication system of claim 1 wherein the first wireless access links and the second wireless access links comprise Microwave Multipoint Distribution Service (MMDS) links.

8. The communication system of claim 1 wherein the first wireless access links and the second wireless access links comprise Global System for Mobile Communications (GSM) links.

9. The communication system of claim 1 wherein the communication ring comprises a Resilient Packet Ring (RPR).

10. The communication system of claim 1 wherein the communication ring comprises a Metropolitan Area Network (MAN).

11. The communication system of claim 1 wherein the communication ring transfers the user communications using Ethernet over Synchronous Optical Network (SONET) over Wave Division Multiplexing (WDM).

12. The communication system of claim 1 wherein the first wireless hub and the first wireless base station are co-located on a first elevated structure and the second wireless hub and the second wireless base station are co-located on a second elevated structure.

13. The communication system of claim 1 wherein the first connection comprises first bonded circuits and the second connection comprises second bonded circuits, wherein the first bonded circuits and the second bonded circuits comprise unbundled network elements obtained from an Incumbent Local Exchange Carrier (ILEC).

14. The communication system of claim 1 wherein the first wireless base stations and the second wireless base stations have different busy hours and share bandwidth over the point-to-multipoint wireless links and the communication ring.

15. A method of operating a communication system, the method comprising:
    exchanging user communications over first wireless access links between a plurality of first wireless base stations and mobile users and over second wireless access links between a plurality of second wireless base stations and the mobile users;
    exchanging the user communications between a first one of the first wireless base stations and a first wireless hub and between a first one of the second wireless base stations and a second wireless hub, wherein the first one of the first wireless base stations and the first wireless hub are co-located and the first one of the second wireless base stations and the second wireless hub are co-located;
    exchanging the user communications in an Ethernet format over first point-to-multipoint wireless links between other ones of the first wireless base stations and the first wireless hub and over second point-to-multipoint wireless links between other ones of the second wireless base stations and the second wireless hub;
    exchanging the user communications in the Ethernet format over a first connection between the first wireless hub and a first ring access node of a communication ring and over a second connection between the second wireless hub and a second ring access node of the communication ring; and
    exchanging the user communications between the first ring access node and a third ring access node and between the second ring access node and the third ring access node over the communication ring;
    exchanging the user communications in the Ethernet format between the third ring access node and a mobile switching center; and
    exchanging the user communications between the mobile switching center and a local telephone network, a long distance telephone network, and an Internet.

16. The method of claim 15 wherein the first connection comprises first bonded circuits and the second connection comprises second bonded circuits.

17. The method of claim 15 wherein the first connection and the second connection comprise fiber links that use Synchronous Optical Network (SONET) or Passive Optical Network (PON).

18. The method of claim 15 wherein the first wireless access links and the second wireless access links comprise Personal Communication Service (PCS) links.

19. The method of claim 15 wherein the first wireless access links and the second wireless access links comprise Time Division Multiple Access (TDMA) links.

20. The method of claim 15 wherein the first wireless access links and the second wireless access links comprise Microwave Multipoint Distribution Service (MMDS) links.

21. The method of claim 15 wherein the first wireless access links and the second wireless access links comprise Code Division Multiple Access (CDMA) links.

22. The method of claim 15 wherein the first wireless access links and the second wireless access links comprise Global System for Mobile Communications (GSM) links.

23. The method of claim 15 wherein the communication ring comprises a Resilient Packet Ring (RPR).

24. The method of claim 15 wherein the communication ring comprises a Metropolitan Area Network (MAN).

25. The method of claim 15 wherein the communication ring transfers the user communications using Ethernet over Synchronous Optical Network (SONET) over Wave Division Multiplexing (WDM).

26. The method of claim 15 wherein the first wireless hub and the first wireless base station are co-located on a first elevated structure and the second wireless hub and the second wireless base station are co-located on a second elevated structure.

27. The method of claim 15 wherein the first connection comprises first bonded circuits and the second connection comprises second bonded circuits, wherein the first bonded circuits and the second bonded circuits comprise unbundled network elements obtained from an Incumbent Local Exchange Carrier (ILEC).

28. The method of claim 15 wherein the first wireless base stations and the second wireless base stations have different busy hours and share bandwidth over the point-to-multipoint wireless links and the communication ring.

* * * * *